United States Patent
Lee et al.

(10) Patent No.: US 9,036,528 B2
(45) Date of Patent: May 19, 2015

(54) MOBILE COMMUNICATION SYSTEM AND METHOD FOR MANAGING TERMINAL PAGING IN THE SYSTEM

(75) Inventors: Hyung Yeol Lee, Seoul (KR); Song Yean Cho, Seoul (KR); Beom Sik Bae, Suwon-si (KR); Sang Soo Jeong, Suwon-si (KR); Kwang Soon Kim, Seoul (KR); Chae Gwon Lim, Seoul (KR)

(73) Assignees: Samsung Electronics Co., Ltd., Suwon-si (KR); Industry-Academic Cooperation Foundation, Yonsei University, Seoul (KR)

( * ) Notice: Subject to any disclaimer, the term of this patent is extended or adjusted under 35 U.S.C. 154(b) by 0 days.

(21) Appl. No.: 14/235,304

(22) PCT Filed: Jul. 27, 2012

(86) PCT No.: PCT/KR2012/006039
§ 371 (c)(1),
(2), (4) Date: Jan. 27, 2014

(87) PCT Pub. No.: WO2013/015658
PCT Pub. Date: Jan. 31, 2013

(65) Prior Publication Data
US 2014/0169251 A1 Jun. 19, 2014

(30) Foreign Application Priority Data

Jul. 27, 2011 (KR) .................. 10-2011-0074433

(51) Int. Cl.
*H04W 68/02* (2009.01)
*H04W 4/00* (2009.01)
*H04W 52/02* (2009.01)
*H04W 56/00* (2009.01)

(52) U.S. Cl.
CPC .............. *H04W 68/02* (2013.01); *H04W 4/005* (2013.01); *H04W 52/0216* (2013.01); *H04W 56/001* (2013.01)

(58) Field of Classification Search
CPC ........................... H04W 68/02; H04W 56/001
USPC ......... 370/311, 328–329, 335–336, 342–343, 370/345, 350, 389, 392, 437, 441–443, 465, 370/479–480, 498, 503, 509–510, 512
See application file for complete search history.

(56) References Cited

U.S. PATENT DOCUMENTS 5,604,744 A * 2/1997 Andersson et al. ........... 370/347
6,795,425 B1 * 9/2004 Raith ............................ 370/345
7,286,841 B2 * 10/2007 Sun et al. ...................... 455/502

(Continued)

FOREIGN PATENT DOCUMENTS

| KR | 10-2009-0025517 A | 3/2009 |
| KR | 10-2010-0128323 A | 12/2010 |
| KR | 10-2011-0082486 A | 7/2011 |

*Primary Examiner* — Kevin Mew
(74) *Attorney, Agent, or Firm* — Jefferson IP Law, LLP

(57) ABSTRACT

The present invention relates to a mobile communication system, and to a method for managing terminal paging in the system. According to the present invention, local IDs are each allocated to the respective multiple MTC terminals, and therefore trigger periods can be efficiently managed in a network. Further, the multiple MTC terminals can be grouped using the allocated local IDs, thus achieving advantages of an increased number of MTC terminals which can be managed in the network.

22 Claims, 13 Drawing Sheets

(56) References Cited

U.S. PATENT DOCUMENTS

| | | | |
|---|---|---|---|
| 7,974,626 B2* | 7/2011 | Homchaudhuri | 455/436 |
| 8,134,931 B2* | 3/2012 | Laroia et al. | 370/252 |
| 8,150,397 B2* | 4/2012 | Khetawat et al. | 455/436 |
| 8,189,491 B2* | 5/2012 | Laroia et al. | 370/252 |
| 2009/0016284 A1* | 1/2009 | Laroia et al. | 370/329 |
| 2010/0159929 A1* | 6/2010 | Homchaudhuri | 455/436 |

* cited by examiner

MOBILE COMMUNICATION SYSTEM AND METHOD FOR MANAGING TERMINAL PAGING IN THE SYSTEM

TECHNICAL FIELD

The present invention relates to a mobile communication system and method for managing terminals in the system. In particular, the present invention relates to a method for managing of paging Machine-Type Communication terminals in a mobile communication system.

BACKGROUND ART

Recently, the interest in Machine Type Communication (MTC) increases more and more. One of the representative examples is that a metering terminal manager exchanges data with a metering terminal equipped with a communication module which reads and transmit the metered power amount through wireless communication and manages the metering operation. Such an MTC may be applicable to the gas and water supply systems as well as power distribution. Furthermore, it is expected that its application range is continuously expanding.

As the main part of the MTC, the metering terminal measures the utilities such as electricity, water, and gas used by the user and transmits the measured utility data periodically. The MTC-enabled terminal (hereinafter, MTC terminal) is triggered, when it is necessary, to connect to a network for data communication other than maintaining the connection to the network, e.g. base station. That is, the MTC terminal stays in the offline state or sleep state to conserve network resource as far as possible and wakes up at a predetermined interval or only when necessary for data communication.

The MTC terminal is advantageous of small network resource consumption, applicability to diverse fields, and management easiness. Thus, its use is a growing trend.

DISCLOSURE OF INVENTION

Technical Problem

The conventional method of managing MTC terminal in a network uses extended bits for expanding the System Frame Number (SFN). However, the conventional method for managing of triggering MTC terminals is limited in number of terminals and problematic in view of requiring modification of system information. Particularly in a Long Term Evolution (LTE) system, the paging process is specified only for the terminal in idle state but not the MTC terminal.

Accordingly, the present invention aims to provide a mobile communication system and an MTC terminal paging management method and apparatus for use in the mobile communication system.

Solution to Problem

In order to solve the above problem, a terminal paging method of a mobile communication system according to an embodiment of the present invention includes receiving, at a terminal, a local counter value for synchronization with a base station and a local ID allocated to the terminal by the base station from the base station, synchronizing a counter with the base station using the local counter value and entering an idle state, and checking a paging trigger message included in a subframe corresponding to the local counter and local ID.

A paging method of a base station includes transmitting to a terminal a local counter value for synchronization of the terminal with the base station and a local ID allocated by the terminal, receiving a paging request message from an MME, and transmitting to the terminal a paging trigger message in a subframe corresponding to the local counter and the local ID.

A terminal according to an embodiment of the present invention a communication unit which transmits and receives signals to and from a base station; and a control unit which controls receiving, at a terminal, a local counter value for synchronization with a base station and a local ID allocated to the terminal by the base station from the base station, synchronizes a counter with the base station using the local counter value, enters an idle state, and checks a paging trigger message included in a subframe corresponding to the local counter and local ID.

A base station according to an embodiment of the present invention includes a communication unit which transmits and receives signal to and from a terminal or an MME and a control unit which controls transmitting to a terminal a local counter value for synchronization of the terminal with the base station and a local ID allocated by the terminal, receiving a paging request message from an MME, and transmitting to the terminal a paging trigger message in a subframe corresponding to the local counter and the local ID.

Advantageous Effects of Invention

The MTC terminal paging management method and apparatus of the present invention is advantageous of managing trigger interval efficiently by allocating a local ID to a plurality of MTC terminals and using a local counter synchronized with terminals. The MTC terminal paging management method and apparatus of the present invention is advantageous in increasing the number of MTC terminals that can be managed in the network by paging the plural MTC terminals simultaneously using the local ID.

The MTC terminal paging management method and apparatus of the present invention is addressed to the corresponding terminals without modification of the system using the ID allocated per terminal and the local counter and thus advantageous of improving the utilization efficiency as compared to the method of increasing the paging period of the terminal with the extended bits.

MODE FOR THE INVENTION

The term 'terminal' denotes an information processing device capable of transmitting/receiving a message through a network. Particularly, the terminal is of being paged at a predetermined interval or an interval necessary for transmitting data such as measured physical quantity. Here, the description is directed to the Machine Type Communication (MTC) terminal. The MTC terminal is the terminal (such as electricity meter, water meter, and gas meter) capable of measuring the utilities at a place like a building and transmitting the measurement data to a management server.

Exemplary embodiments of the present invention are described with reference to the accompanying drawings in detail. Detailed description of well-known functions and structures incorporated herein may be omitted to avoid obscuring the subject matter of the present invention. Further, the following terms are defined in consideration of the functionality in the present invention, and may vary according to the intention of a user or an operator, usage, etc. Therefore, the definition should be made on the basis of the overall content of the present specification.

Figure 1:
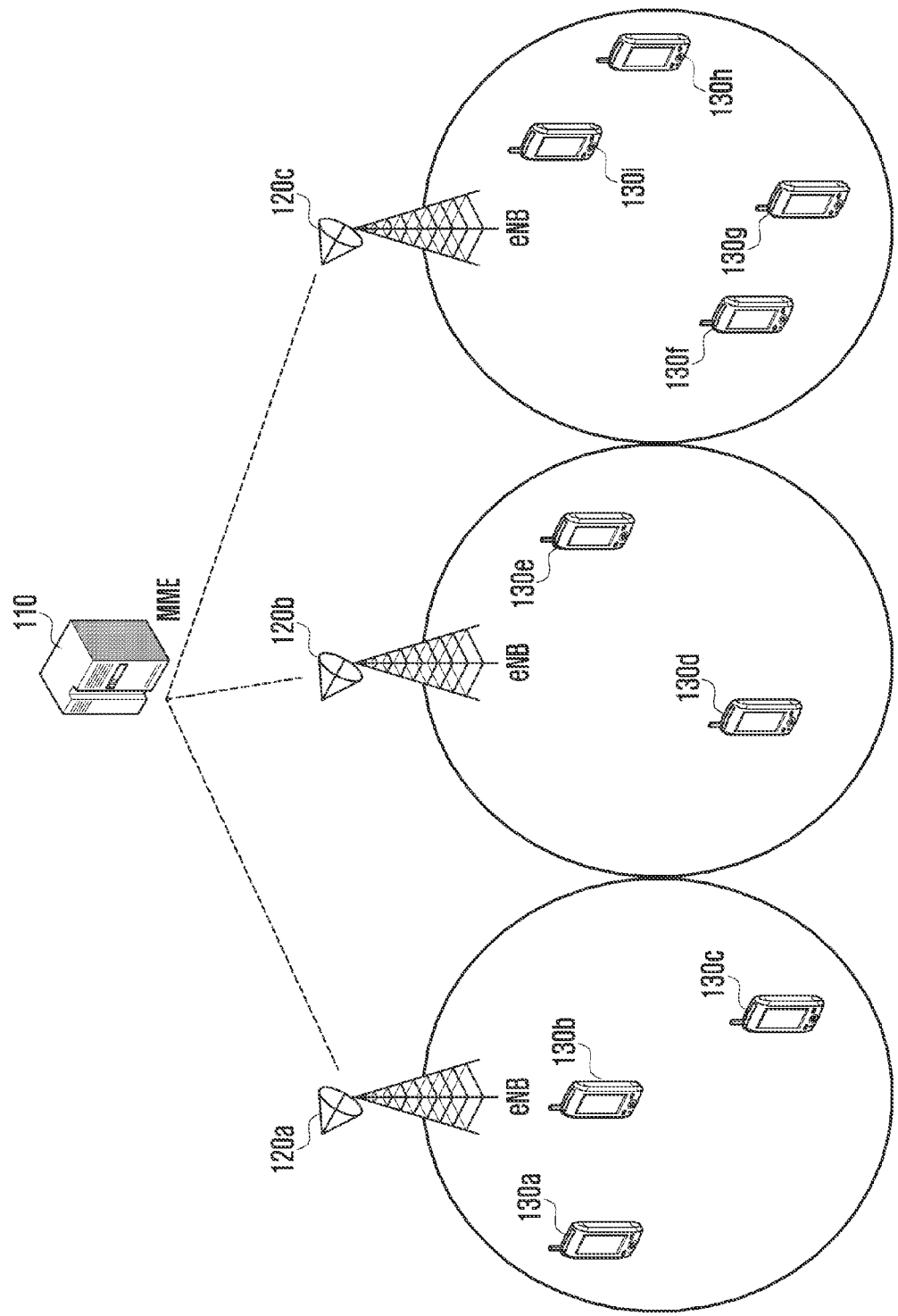
FIG. 1 is a diagram illustrating a mobile communication system according to the present invention.

FIG. 1 is a diagram illustrating a mobile communication system according to the present invention.

Referring to FIG. 1, the mobile communication system includes a Mobility Management Entity (MME) 110, evolved Node Bs (eNBs) 120a, 120b, and 120c, and terminals 130a, 130b, 130c, 130d, 130e, 130f, 130g, 130h, and 130i.

The MME 110 is a mobility management entity for managing mobility of the terminals. Here, the MME 110 transmits paging information for use in calculating the frame carried a trigger message for paging in initial registration of the terminal. If the trigger message is received from a higher layer, the MME 110 performs paging the terminal by means of the eNB.

For example, if the MTC terminal is a meter measuring monthly electricity usage, it has to transmit the measured electricity usage to the terminal manager at least once per month. In order to receive the measured electricity usage, if a trigger message is received from the terminal manager, the MME requests the eNB serving the corresponding terminal for paging to establish a connection to the corresponding meter.

The eNBs 120a, 120b, and 120c denote the base stations to which at least one terminal 130a, 130b, 130c, 130d, 130e, 130f, 30g, 30h, and 130i. Here, when the eNBs 120a, 120b, and 120c register the terminals 130a, 130b, 130c, 130d, 130e, 130f, 30g, 30h, and 130i located within their cells, they allocate local IDs and local counters to the corresponding terminal for use in paging.

If the MME 110 requests for paging, the eNBs 120a, 120b, and 120c send a paging response message to the MME 110. At this time, the paging response message includes a value a value indicating whether the terminal is triggered actually or, if the paging interval with the local ID is delayed as compared to a predetermined paging interval, information on the delayed paging interval. Next, the eNBs 120a, 120b, and 120c performs paging of the corresponding terminal.

The terminals 130a, 130b, 130c, 130d, 130e, 130f, 30g, 30h, and 130i are devices capable of connecting to the network for transmitting/receiving various data. Here, the description is made under the assumption that the terminal is Machine Type Communication (MTC) terminal. The terminal may be any of electricity meter, water meter, and gas meter having a communication function and may be any of mobile terminal and computer. The terminal may transmits a signaling message including at least one of terminal identity information, terminal location information, neighbor eNB information, measurement data on physical amount such as electricity and water.

Each of the terminals 130a, 130b, 130c, 130d, 130e, 130f, 30g, 30h, and 130i stores the local ID and local counter received form the connected eNB 120a, 120b, and 120c. The terminals 130a, 130b, 130c, 130d, 130e, 130f, 30g, 30h, and 130i may be paged at a subframe assigned the local ID among the paging frames of the corresponding local counter. For this purpose, the terminals 130a, 130b, 130c, 130d, 130e, 130f, 30g, 30h, and 130i store the local timers and local ID synchronized with the eNBs 120a and 120b to which they have connected.

Figure 2:
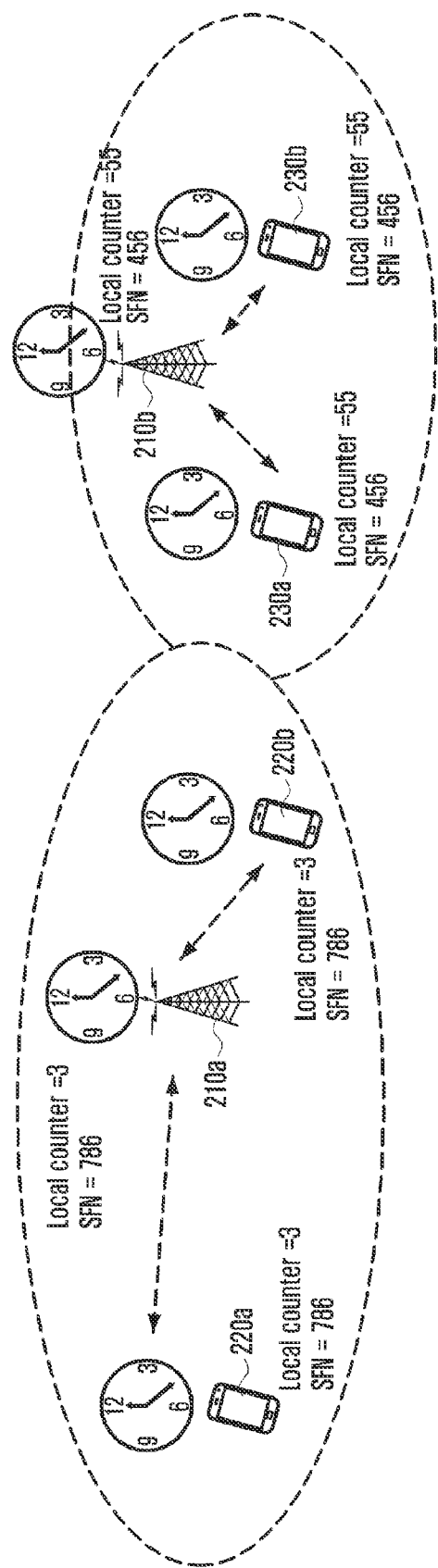
FIG. 2 is a diagram illustrating a local counter synchronization method between a terminal and an eNB according to an embodiment of the present invention.

FIG. 2 is a diagram illustrating a local counter synchronization method between a terminal and an eNB according to an embodiment of the present invention.

Referring to FIG. 2, there are two cells managed by a first eNB 210a and a second eNB 210b, terminals 220a and 220b are located within the cell managed by the first eNB 210a, and terminals 230a and 230b are located within the cell managed by the eNB 210b. It is assumed that the local counter of the first eNB 210a indicates 3 and the local counter of the second eNB 210b indicates 55 currently.

When each of the terminals 230a, 230b, 230c, and 230d is registered with each of the eNBs 210a and 210b, each terminal 230a, 230b, 230c, or 230d is synchronized with the eNB 210a or 210b. That is, the terminal 220a and 220b located within the cell managed by the first eNB 210a are synchronized using the counter indicating 3, and the terminals 230a and 230b located within the cell managed by the second eNB 210b are synchronized using the counter indicating 55.

The terminal registration with an eNB include the case where the terminal powers on and communicates with an eNB first after being manufactured or the case where the terminal moves so as to reselect a cell and communicate with the eNB managing the reselected cell.

The local counter synchronized between the eNBs 210a and 210b and the terminals 230a, 230b, 230c, and 230d increment by 1 whenever a predetermined number of frames. The increment of the local counter is cyclic in the range of local counter bits. That is, the local counter of N bits increases from 0 to 2n−1 cyclically.

For example, it is assumed that the number of System Frame Numbers (SFNs) is 1024. In this case, the local counter increments by 1 when 1024 subframes have been cycled. In the case that the local counter is 3 bits, the local counter counts from 0 to 7 and returns to 0.

Since the synchronized local counter is used in paging, it is possible to distribute the overload caused by paging and triggering a plurality of terminals simultaneously. Also, it is possible to adjust the paging interval using the local counter synchronized between the terminal and the eNB.

Figure 3:
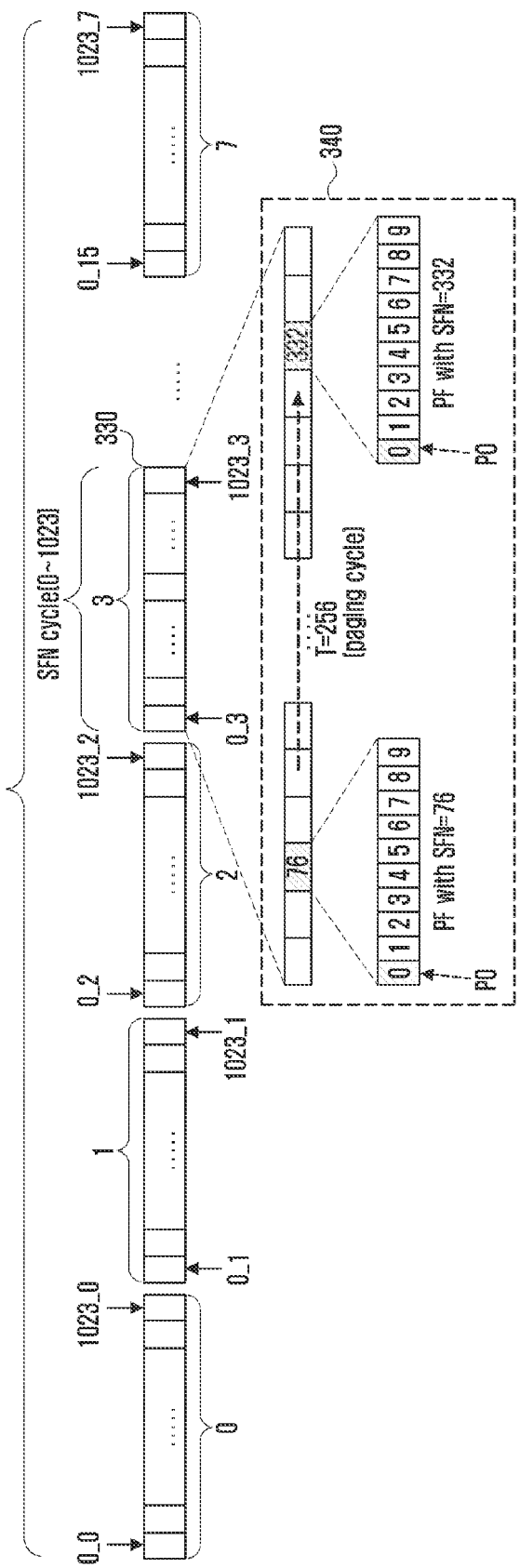
FIG. 3 is a diagram illustrating a paging procedure of a terminal according to an embodiment of the present invention.

FIG. 3 is a diagram illustrating a paging procedure of a terminal according to an embodiment of the present invention.

Referring to FIG. 3, the terminal calculates the frame number for checking the trigger message for paging using the paging information received from the MME. In more detail, the terminal receives the paging information as shown in the table 310. Then the terminal checks the Paging Frame (PF) for wakeup using the paging information.

FIG. 3 shows the case where it is assumed that the $76^{th}$ frame is determined as the paging frame. It is assumed that the local counter synchronized between the terminal and the eNB indicates 3 and is 3 bits so as to count from 0 to 7.

In this case, the terminal counts 0 for the frames 0 to 1023 received first from the eNB. Next, the terminal counts 1 for the frames 0 to 1023 received next. The terminal counts 2 for the frames 0 to 1023 received next. Then the terminal wakes up at the frame configured as PF among frames starting from 0 in the third count 330.

That is, the terminal wakes up at the $76^{th}$ frame to check the trigger message for paging as denoted by reference number 340. Next, the terminal wakes up again at the $332^{nd}$ frame after the paging cycle of 256 frames. In the case of adjusting the paging cycle using the local counter in this way, there is no need of modifying the system because any extended bit is not used for modifying SFN.

Figure 4:
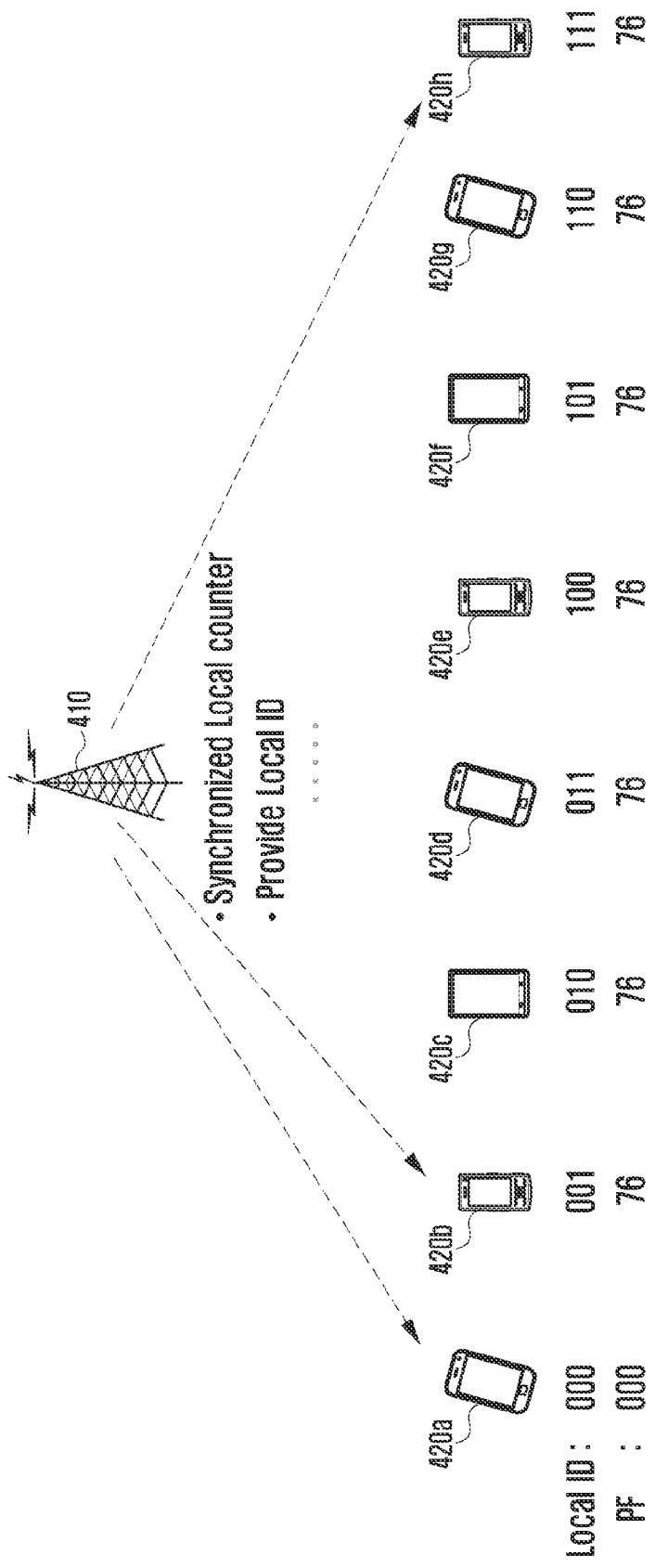
FIG. 4 is diagram illustrating a method of allocating a local ID for use between a terminal and an eNB according to an embodiment of the present invention.

FIG. 4 is diagram illustrating a method of allocating a local ID for use between a terminal and an eNB according to an embodiment of the present invention.

Referring to FIG. 4, the eNB 410 may allocate local IDs to the terminals 420a, 420b, 420c, 420d, 420e, 420f, 420g, and 420h synchronized with it in local counter. Here, the local ID is of being allocated for use in checking the sensing duration of the subframe for waking up and paging when the counter of the current frame received by the terminal matches the local counter which is synchronized with the eNB.

At this time, the Paging Frame (PF) as the frame carrying the trigger message for indicating whether to perform paging in the range of the number of frames and the Paging Occasion (PO) duration are not changed. The PO duration is comprised of a plurality of subframes constituting one PF and determined per a plurality of terminals. The terminal wakes up to check the trigger message for paging in the PO duration as the subframe allocated to it in the PF.

FIG. 4 is directed to the case where it is assumed that the terminals 420a, 420b, 420c, 420d, 420e, 420f, 420g, and 420h are allocated 3-bit local IDs.

In this case, the eNB 410 allocates the local ID of 000 to the terminal 420a, the local ID of 001 to the terminal 420b, the local ID of 010 to the terminal 420c, the local ID of 011 to the terminal 420d, the local ID of 100 to the terminal 420e, the local ID of 101 to the terminal 420f, the local ID of 110 to the terminal 420g, and the local ID of 111 to the terminal 420h.

The terminal allocated a local ID checks the PF among the frames received from the eNB in the corresponding local counter for paging. The terminal wakes up to check the trigger message for paging in the PO duration as the subframe allocated with the corresponding local ID of the checked PF.

Next, the eNB transmits the local counter and local ID in the RRC Connection Release message to the terminal located in the cell it manages. For this purpose, the fields for writing the local counter and local ID are added to the RRC Connection Release message in addition to the legacy fields. Although the description is directed to the method of allocating local ID per terminal the present invention is not limited thereto. That is, the eNB may group a plurality of local IDs allocated to plural terminal into a group local ID.

Figure 5:
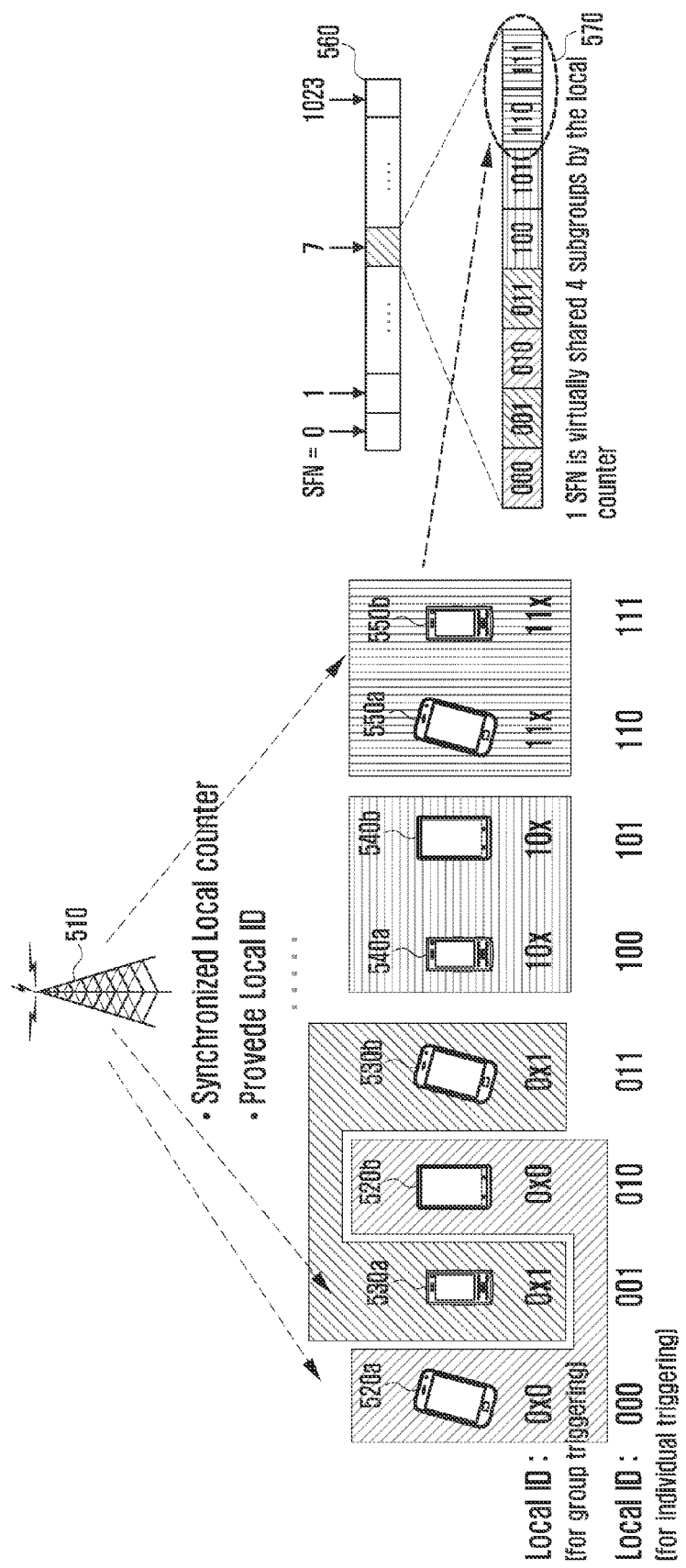
FIG. 5 is a diagram illustrating a method for allocating a group local ID for use between terminals and an eNB according to an embodiment of the present invention.

FIG. 5 is a diagram illustrating a method for allocating a group local ID for use between terminals and an eNB according to an embodiment of the present invention.

Referring to FIG. 5, the eNB 510 may allocate the local ID per terminal. For example, assuming that a 3-bit local ID is allocated, the eNB 510 may allocates the local IDs of 000, 001, 010, 011, 100, 101, 110, and 111 to the terminals 520a, 530a, 520b, 530b, 540a, 550a, 540b, and 550b, respectively.

The base station 510 may allocate the same local ID to the terminals of same type or same feature. The eNB 510 may allocate a group local ID by grouping the per-terminal local IDs in the form of a mask of the elements remained after excluding the ID element common in the local IDs. Also, the terminals allocated similar local IDs may be grouped.

For example, the terminal 520a allocated the local ID of 000 and the terminal 520b allocated the local ID of 010 may be grouped with a local ID 0X0. The ID element common in both the local ID of 001 of the terminal 530a and the local ID of 011 of the terminal 530b are the first digit 0 and the last digit 1. In this case, the terminal 530a allocated the local ID of 001 and the terminal 530b allocated the local ID 011 may be grouped with a group local ID of 0X1. Also, the terminal 540a allocated the local ID of 100 and the terminal 540b allocated the local ID of 101 may be grouped with a group local ID of 10X. Lastly, the germinal 550b allocated the local ID of 110 and the terminal 550b allocated the local ID of 111 may be grouped with the group local ID of 11X.

In this case, the terminals grouped with a group local ID may be paged in the PF duration allocated to the group. For example, it is assumed that the $7^{th}$ frame is the PF for paging check and the terminals 550a and 550b grouped with 11X are paged. Then, since the terminals 550a and 550b are allocated the local ID of 11X, they check the PO duration at the $7^{th}$ frame among the frames 560 received from the eNB when the local counter indicates 7 and 8.

In the case of using the 3-bit local counter in this way, it is possible to obtain the effect that 8 terminals grouped into 4 groups use one frame for paging dividedly.

Although there may be various methods for the eNB to allocate a group ID to the terminals, two representative methods are described hereinafter with reference to FIGS. 6 and 7.

Figure 6:
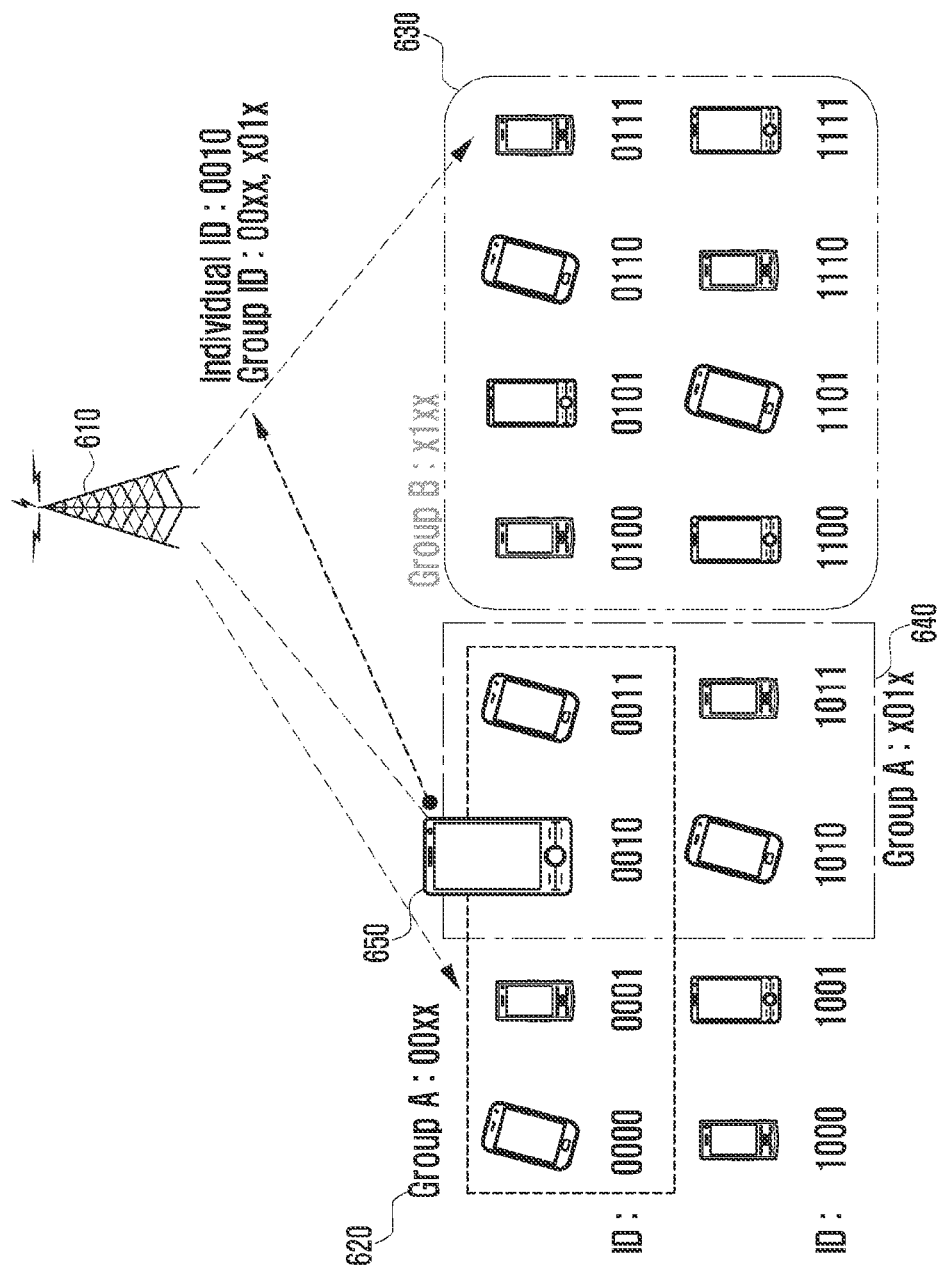
FIG. 6 is a diagram for explaining a method for allocating a group local ID with local ID and mask between the terminals and eNB according to an embodiment of the present invention.

FIG. 6 is a diagram for explaining a method for allocating a group local ID with local ID and mask between the terminals and eNB according to an embodiment of the present invention.

Referring to FIG. 6, a description is made under the assumption that a 4-bit local ID is allocated to terminals. The eNB 610 may allocates a group local ID using a mask to the local ID of the grouped terminals. In more detail, the eNB 610 allocates local IDs to the individual terminals. The local IDs allocated to the individual terminals may be 0000, 0001, 0010, 0011, 0100, 0101, 0110, 0111, 1000, 1001, 1010, 1011, 1100, 1101, 1110, and 1111. The eNB 610 sorts the local IDs of the terminals having the same characteristic into a group.

For example, the base station 610 may group the local IDs of 0000, 0001, 0010, and 0011 into group A 620 and allocate a group local ID of 00XX. The eNB 610 group the local IDs of 0100, 0101, 0110, 0111, 1100, 1101, 1110, and 1111 into group B 630 and allocate a group local ID X1XX. The eNB 610 also may group the local IDs of 010, 0011, 1010, and 1011 into group C 640 and allocate a group local ID of X01X.

At this time, the local IDs 1000 and 1001 that are not grouped may coexist with the group local IDs.

If the group local IDs are allocated in this way, a certain terminal may be allocated a plurality of group local IDs. For example, the terminal 650 allocated the individual local ID 0010 belongs to the group A 620 and group C 640. Accordingly, the terminal 650 may be allocated the group local IDs 00XX and X01X as well as individual local ID 0010.

Figure 7:
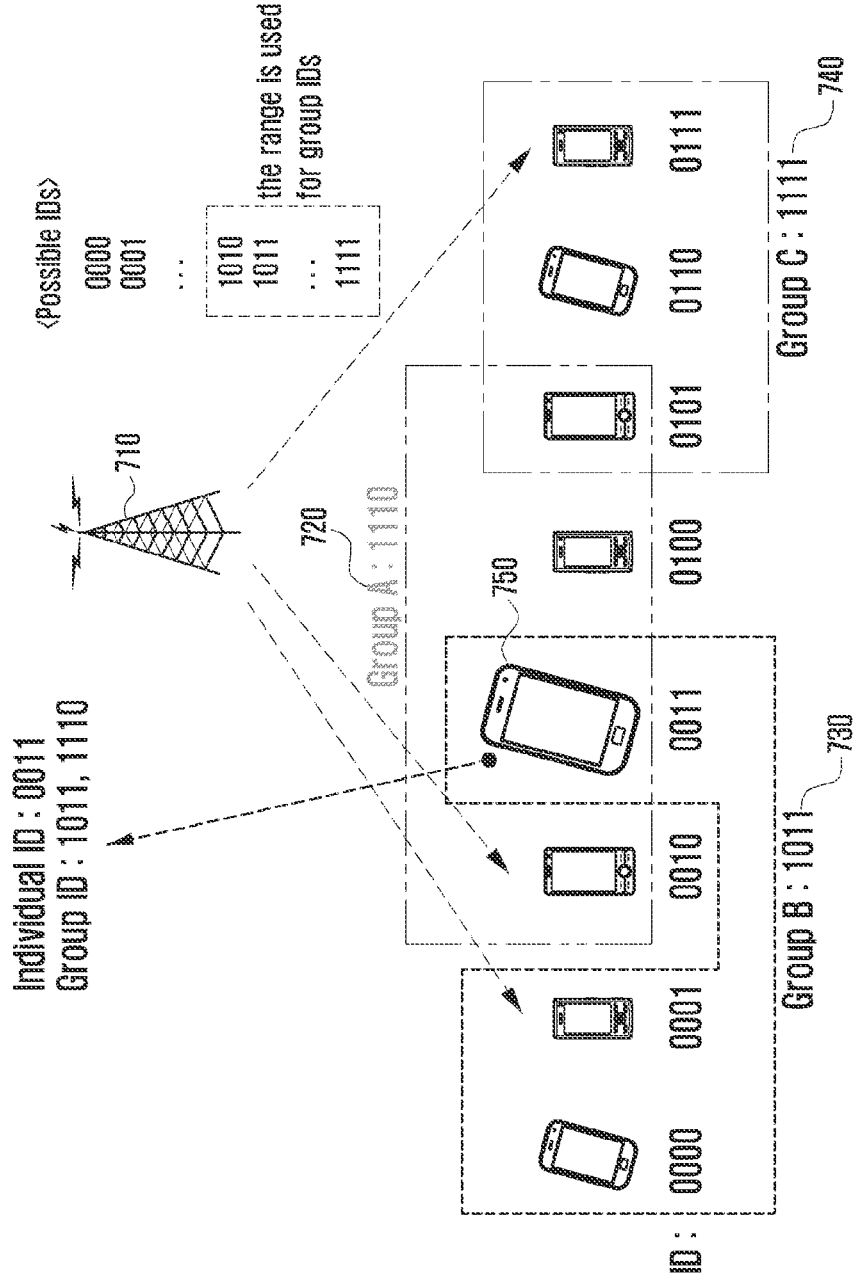
FIG. 7 is a diagram for explaining a method for allocating local ID and group local ID for use between the terminals and eNB according to an embodiment of the present invention.

FIG. 7 is a diagram for explaining a method for allocating local ID and group local ID for use between the terminals and eNB according to an embodiment of the present invention.

FIG. 7 is directed to the case assuming that the 4-bit local ID is allocated to the terminal. In this case, the eNB 710 determines one of the local IDs allocated to the terminals as a group local ID and uses the determined ID as the group local ID.

In more detail, the eNB 710 may allocates the local IDs of 0000, 0001, 0010, 0011, 0100, 0101, 0110, 0111, 1000, 1001, 1010, 1011, 1100, 1101, 1110, 1111. The eNB 710 selects 1010, 1011, 1100, 1101, 1110, and 1111 for use as the group local IDs.

Then the eNB 710 allocates the local IDs of 0000, 0001, 0010, 0011, 0100, 0101, 0110, and 0111 to the individual terminals. The eNB 710 sorts local IDs allocated the terminals having the same type or feature into a group. For example, the eNB 710 groups the local IDs 0010, 0011, 0100, and 0101 into group A and designates 1110 among the group local IDs as the group local ID of the group A as denoted by reference number 720. The eNB groups the local IDs 0000, 0001, and 0011 into group B and designates 1011 among the group local IDs as the group local ID of group B as denoted by reference number 730. The eNB 710 groups the local IDs 0101, 0110, and 0111 into group C and designates 1111 among the group local IDs as the group local ID of group C as denoted by reference number 740.

If the group local IDs are allocated in this way, a certain terminal may be allocated a plurality of group local IDs. For example, the terminal 750 may be allocated the local ID of 0011 and group local IDs of 1011 and 1110.

Figure 8:
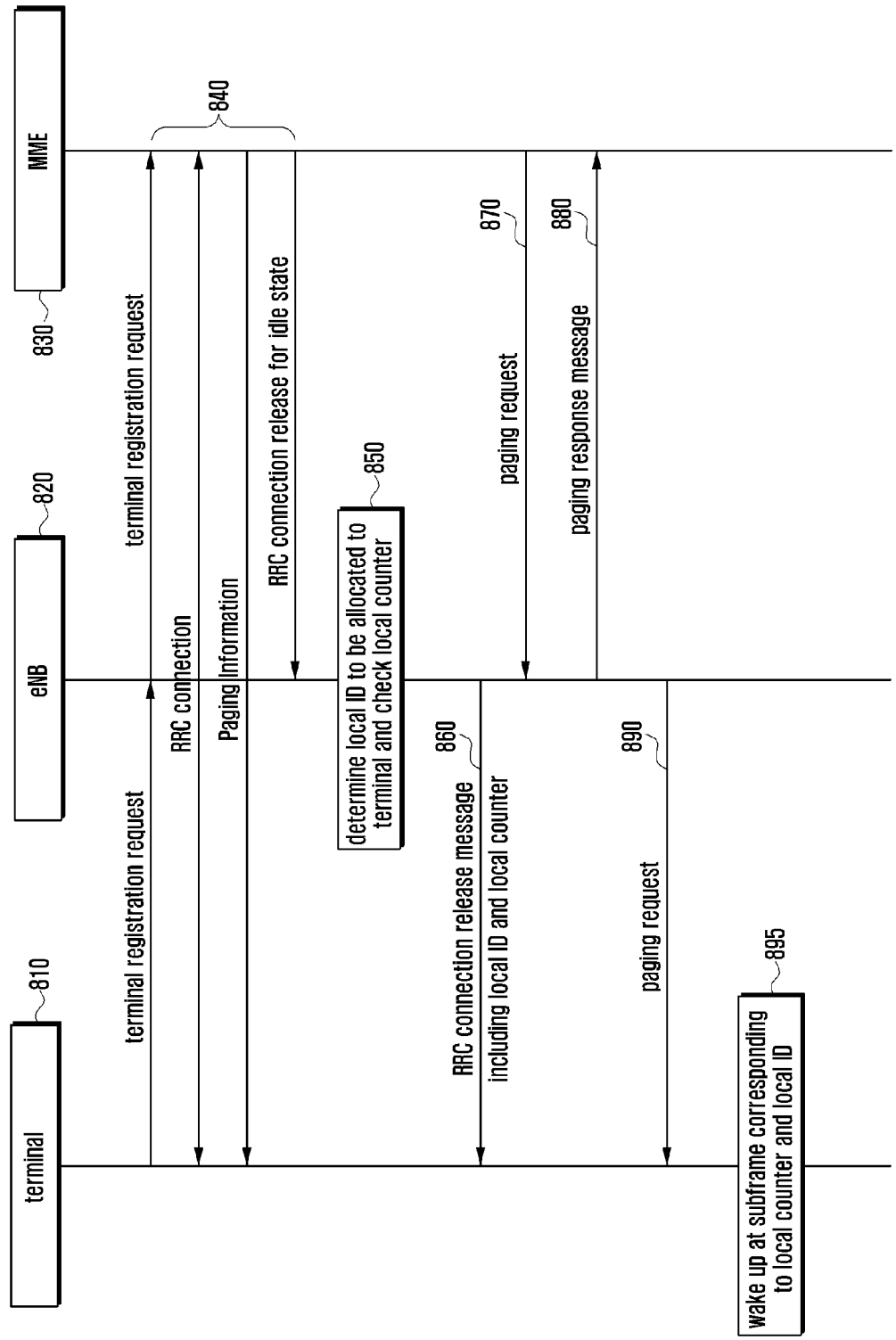
FIG. 8 is a diagram illustrating a paging method for use in the mobile communication system according to an embodiment of the present invention.

FIG. 8 is a diagram illustrating a paging method for use in the mobile communication system according to an embodiment of the present invention.

Referring to FIG. 8, the mobile communication system includes a terminal 810, an eNB 820, and an MME 830. In order to manage paging the terminal, the components constituting the mobile communication system exchange signals as follows.

First, the terminal 810 performs registration procedure with the MME 830 through the eNB 820. In more detail, the terminal sends the MME 830 a terminal registration request via the eNB 830 for registering it with the MME 830. Upon receipt of this, the MME 830 sends the terminal 810 a response message in response to the registration request. The terminal 810, eNB 820, MME 830 perform RRC connection establishment.

The MME 830 sends the terminal 810 the paging information via the eNB 820 in order for the terminal to check the trigger message at the paging interval. Next, the MME 840 sends the eNB 810 an RRC Connection Release message for the terminal 810 to enter the idle state.

Then the eNB 720 determines the local ID to be allocated to the terminal 810 at step 850. The eNB 820 sends the terminal 810 the RRC Connection Release message including the information on the determined local ID and checked local counter at step 860. At this time, the MME 830 does not participate in the procedure of exchanging the local counter and local ID information through signaling between the terminal 810 and the eNB 820. Since the description on the method for the eNB 820 to synchronize the local counter and allocate the local ID has been made with reference to FIGS. 2 to 7, detailed description thereof is omitted herein.

Although not shown in the drawing, the terminal 810 stores the local ID and local counter received from the eNB 820 and synchronize the local counter with the eNB 820. Next, the terminal 810 enters the idle state.

Next, if paging is requested by the terminal manager managing the terminal 810 on the higher layer, the MME 830 sends the eNB 820 a paging request message including a trigger message at step 870. At this time, the eNB 820 sends the MME 830 a paging response message first in response to the paging request at step 880.

In this case, the paging interval with the local ID may be longer than a predetermined paging interval. Accordingly, in order to prevent unnecessary step-wise paging of the MME 830, the eNB 820 notifies the MME 830 of the delayed paging interval. Here, the eNB 820 may include the information on when the terminal 801 is triggered based on the local ID and local counter allocated to the terminal 810 in the paging response message.

Afterward, the eNB 820 sends the terminal 810 the paging request including the trigger message in a subframe at step 890. Then the terminal 810 wakes up at the subframe determined based on the local counter and local ID allocated to the terminal at step 895. The terminal 810 checks the trigger message included in the corresponding subframe and performs paging.

Hereinabove, the description has been made of a method of paging at the subframe determined based on the local ID and local counter that are received from the eNB in the procedure for the terminal to register initially with the MME. Hereinafter, a description is made of the method for sharing the local ID and local counter between the terminal and the eNB when a cell is reselected due the movement of the terminal.

In the case that the terminal in the idle state reselects a cell due the change in location, the terminal has to request for local ID and local counter for paging from the eNB. In the case that the terminal is located at the cell edge, however, the terminal is likely to perform cell reselection frequently according to the signal strength of the eNB. In this case, the terminal requests the eNB managing the neighbor cell for the local ID and local counter frequently. That is, the local ID and local counter are requested redundantly. As a consequence, the terminal retains the local ID and local counter stored previously without deleting for a predetermined period. This method is described in detail with reference to FIG. 9.

Figure 9:
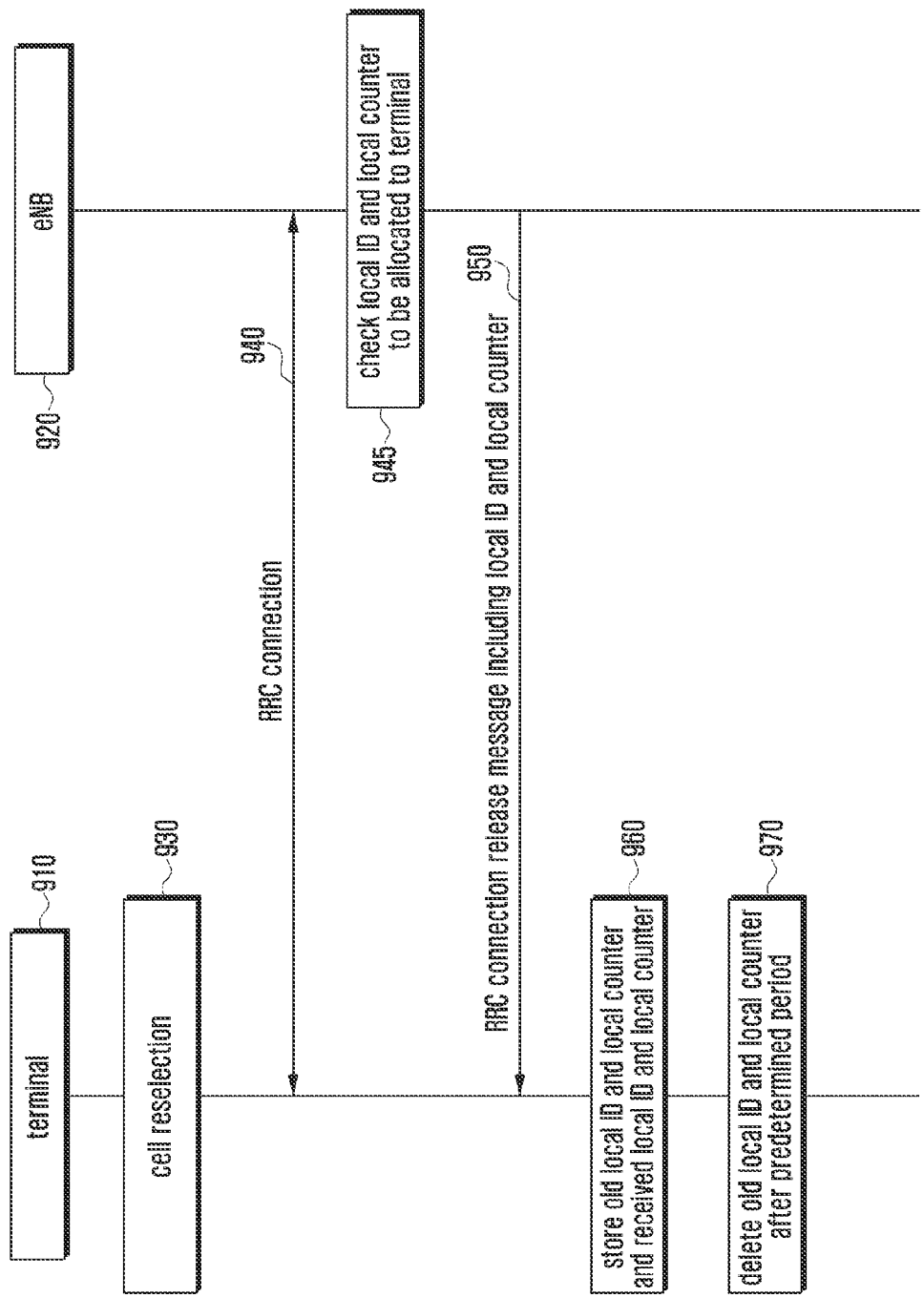
FIG. 9 is a diagram illustrating a method of managing local ID in association with cell reselection process according to an embodiment of the present invention.

FIG. 9 is a diagram illustrating a method of managing local ID in association with cell reselection process according to an embodiment of the present invention.

Referring to FIG. 9, if the terminal 910 moves to the cell managed by the eNB 920, it performs cell reselection at step 930. The terminal 910 sends the eNB 920 a message for registration with the corresponding eNB and a message requesting for local counter and local ID. Upon receipt of this, the eNB 920 establishes an RRC connection at step 940.

Next, the eNB 920 checks the local ID and local counter to be allocated to the terminal 910 at step 945. Next, the eNB 920 sends the terminal 910 an RRC Connection Release message including the checked local ID and local counter at step 950. Even in this case, the local ID and local counter are shared between the eNB 920 and the terminal 910, it is not necessary for the MME to participate in.

Then the terminal 910 stores the received local ID and local counter along with the previously stored local ID and local counter. The terminal 910 deletes the old local ID and local counter after a predetermined period at step 970. Although not depicted in the drawing, the terminal 910 may check the trigger message for paging in the PO duration corresponding to the subframe of the frame allocated based on the currently received local ID and local counter. According to the presence/absence of the trigger message, the terminal 910 may receive the paging message from the eNB.

Figure 10:
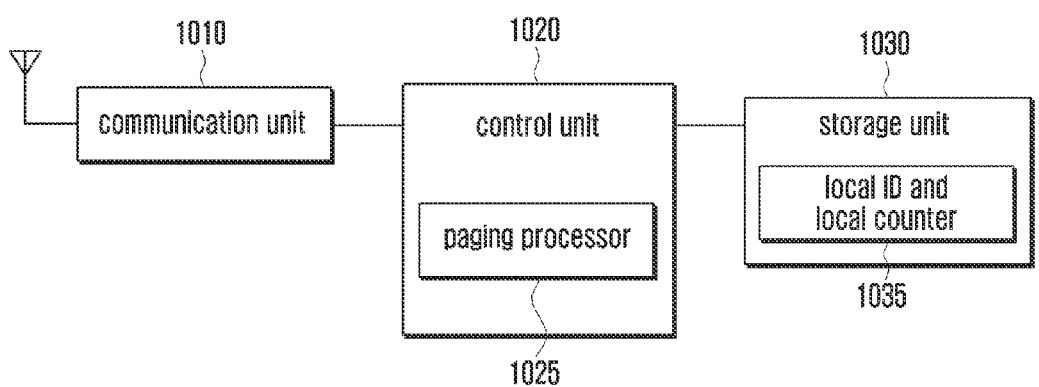
FIG. 10 is a block diagram illustrating a configuration of the terminal according to an embodiment of the present invention.

FIG. 10 is a block diagram illustrating a configuration of the terminal according to an embodiment of the present invention.

Referring to FIG. 10, the terminal includes a communication unit 1010, a control unit 1020, and a storage unit 1030.

The communication unit 1010 is responsible for communication function of the terminal with the eNB. That is, the communication unit 1010 establishes a communication channel with the eNB to transmit/received data. Here, the communication unit 1010 may transmit a terminal registration request message under the control of the control unit 1020. The communication unit 1010 may receive an RRC Connection Release message including the local ID and local counter from the eNB.

The control unit 1020 controls overall operations and states of the components of the terminal. Here, the control unit 1020 may control to receive paging signal using the local ID and local counter received from the eNB. For this purpose, the control unit 1020 may further include a paging processor 1025.

The paging processor 1025 may control the communication unit 1010 to receive paging signal. In more detail, the paging processor 1025 controls the communication unit 1010 to check the paging information transmitted by the MME through the eNB. The paging processor 1025 also calculates the number of frame (PF) carrying the trigger message for determining the presence/absence of paging information.

Next, the paging processor 1025 controls the storage unit 1030 to store the local ID and local counter included in the RRC Connection Release message received from the eNB. Then the paging processor 1025 enters the idle state.

If a cell reselection occurs due to the movement of the terminal, the paging processor 1025 controls the communication unit 1010 to establish an RRC connection and requests the eNB for the local ID and local counter. The paging processor 1025 also control the storage unit 1030 to store the local ID and local counter received from the eNB along with the old local ID and local counter. At this time, the paging processor 1025 determines whether a predetermined period has elapsed and, if so, controls the storage unit 1030 to delete the old local ID and local counter.

The paging processor 1025 determines whether the paging occasion arrives for determining the presence/absence of paging. If paging occasion arrives, the paging processor 1025 control the communication unit 1010 to wake up at the PO duration of the frame corresponding to the local counter and local ID among the frames received from the eNBs. The paging processor 1025 determines whether a trigger message for paging is included in the PO duration of the corresponding frame. If the trigger message is included, the paging processor 1025 controls the communication unit 1010 to receive the paging signal for establishing a communication channel with the eNB.

The storage unit 1030 stores programs and data concerning the operations of the components constituting the terminal under the control of the control unit 1020. Here, the storage unit 1030 stores the local ID and local counter 1035 received from the eNB under the control of the control unit 1020.

Figure 11:
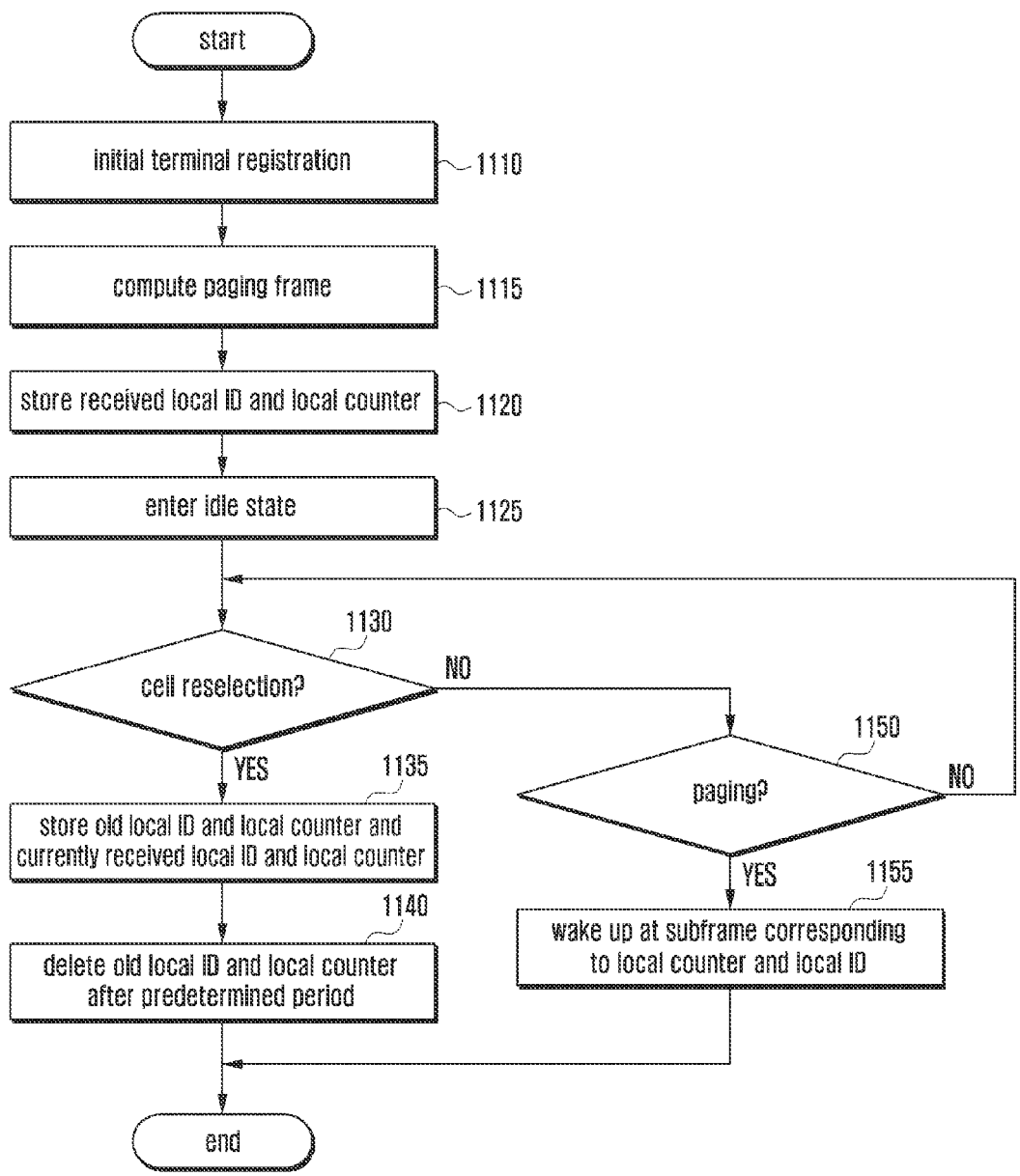
FIG. 11 is a flowchart illustrating a paging processing method of a terminal according to an embodiment of the present invention.

FIG. 11 is a flowchart illustrating a paging processing method of a terminal according to an embodiment of the present invention.

Referring to FIG. 11, the terminal performs initial terminal registration at step 1110. That is, if the terminal powers on, it transmits a Radio Resource Control (RRC) connection message to eNBs around. Then the eNB forwards the RRC Connection message to the MME. The terminal, eNB, and MME are connected through RRC connection.

The terminal calculates the number of frame (PF) carrying the trigger message for use in determining whether there is any paging based on the paging information from the MME at step 1115. The terminal stores the local ID and local counter included in the RRC Connection Release message received from the eNB at step 1120. Next, the terminal enters the idle state at step 1125.

Next, the terminal determines whether there is any cell reselection doe to the movement of the terminal at step 1130. If there is any cell reselection, the terminal establishes an RRC connection and requests the eNB for the local ID and local counter. The terminal receives the local ID and local counter from the eNB. Next, the terminal stores the old local ID and local counter and the currently received local ID and local counter at step 1135. After a predetermine time period elapses, the terminal deletes the old local ID and local counter at step 1140.

If there is no cell reselection at step 1130, the terminal determines whether a paging occasion arrives at step 1150. If the paging occasion arrives, the terminal wakes up in the PO duration of the frame corresponding to the local counter and location ID at step 1155. Although not shown in the drawing, the terminal determines whether a trigger message for paging is received in the PO duration of the corresponding frame. If the trigger message is received, the terminal processes the paging to establish a communication channel with the eNB. Otherwise if not trigger message is received, the terminal determines whether the trigger message is received in the PO duration allocated it among the subframes constituting the frame arriving after the paging cycle.

Figure 12:
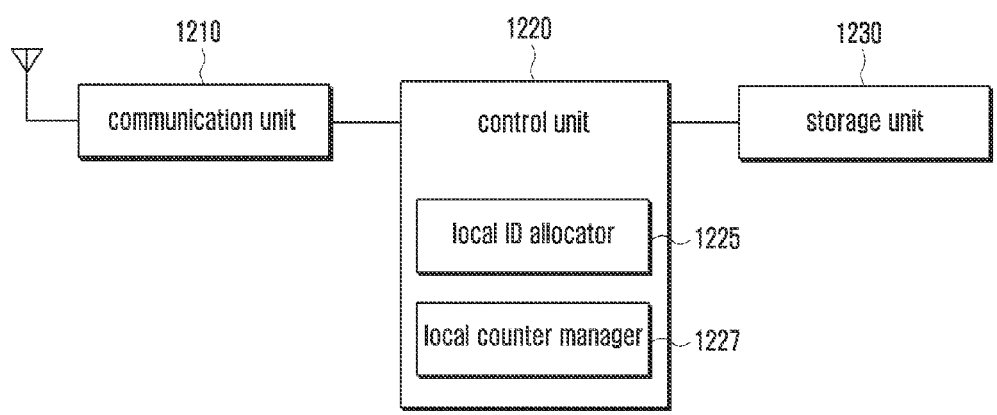
FIG. 12 is a block diagram illustrating the eNB according to an embodiment of the present invention.

FIG. 12 is a block diagram illustrating the eNB according to an embodiment of the present invention.

Referring to FIG. 12, the eNB includes a communication unit 1210, a control unit 1220, and a storage unit 1230.

The communication unit 1210 is responsible for communication function of the terminal for communicating data with the terminal and MME. Here, the communication unit 1210 may establishes an RRC connection with the terminal and MME under the control of the control unit 1220. The communication unit 1210 also may send the terminal the RRC Connection Release message including the information on the local ID and local counter under the control of the control unit 1220. The communication unit 1210 may send the terminal a paging request message from the MME under the control of the control unit 1220.

The control unit 1220 controls the operations and states of all components constituting the eNB. Here, the control unit 1220 may allocates the local ID and local counter per terminal for using in paging. For this purpose, the control unit 1220 includes a local ID allocator 1225 and a local counter manager 1227.

The local ID allocator 1225 may allocates a local ID to the terminal connected to it. Here, the local ID is the ID allocated for use in checking the duration of sensing the frame (PF) for the terminal to wake up for paging when the counter of the frame received at the terminal currently matches the local counter synchronized with the eNB. The local ID allocator 1225 controls the communication unit 1210 to transmit the allocated local ID to the terminal along with the RRC Connection Release message. For this purpose, the fields for writing the local counter and local ID are added to the RRC Connection Release message in addition to the legacy fields. At this time, the local ID allocator 1225 may allocates a group local ID using a mask to the local IDs of the grouped terminals. The local ID allocator 1225 also may allocate some of the local IDs as the group local IDs. If the group local IDs are allocated in which way, a certain terminal may be allocated a plurality of group local IDs.

The local counter manager 1227 increases the local counter synchronized between the eNB and the terminal by 1 whenever a predetermined number of subframes elapses. At this time, the local counter increments cyclically in the range of the local counter bits. That is, in the case of N-bit local counter, the local counter manager 1227 counts from 0 to 2n−1 cyclically. The local counter manager 1227 also sends the corresponding terminal the information on the local counter along with the RRC Connection Release message. For this purpose, a field for writing the local counter is added to the RRC Connection Release message in addition to the legacy fields.

If the RRC Connection Release message for the terminal to enter the idle state is received from the MME, the control unit 1220 controls the communication unit 1210 to transmit the local counter for synchronizing the local ID and local counter allocated to the terminal along with the RRC Connection Release message. If a paging signal is received from the MME by means of the communication unit 1210, the control unit 1220 sends the MME a paging response message. At this time, the control unit 1220 controls the communication unit 1210 to transmit the information on time when the terminal is triggered by the local ID and local counter allocated to the terminal along with the paging response message. The control unit 1220 controls the communication unit 1210 notify the MME of the delayed paging interval to prevent unnecessary step-wise paging of the MME.

The storage unit 1230 stores the programs and data concerning the operations of the components constituting the eNB under the control of the control unit 1220. Here, the storage unit 1230 stores the local IDs and local counters allocated to the individual terminal under the control of the control unit 1220. The storage unit 1230 may store the group local IDs for the grouped IDs allocated to the terminals under the control of the control unit 1220.

Figure 13:
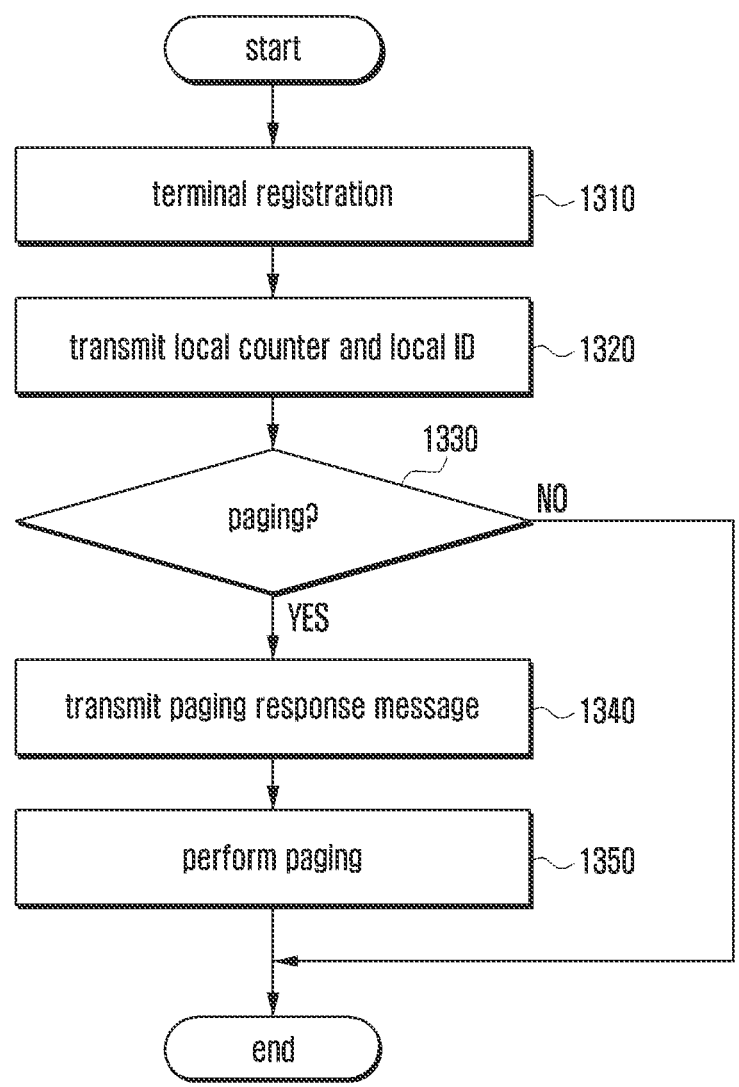
FIG. 13 is a flowchart illustrating the paging method of the eNB according to an embodiment of the present invention.

FIG. 13 is a flowchart illustrating the paging method of the eNB according to an embodiment of the present invention.

Referring to FIG. 13, the eNB performs terminal registration at step 1310. That is, if a registration request is received from the terminal, the eNB establishes an RRC connection between the terminal requesting for registration and the MME. The eNB forwards the paging information received from the MME to the terminal. Next, if an RRC Connection Release message for the terminal to enter the idle state is received from the MME, the eNB sends the UE the local counter and local ID at step 1320. At this time, the eNB transmits the local ID allocated to the terminal and the local counter for synchronizing the counter along with the RRC Connection Release message for releasing the RRC connection.

Next, the eNB determines whether a paging signal is received from the MME at step 1330. If the paging signal is received from the MME, the eNB sends the MME a paging response message at step 1340. At this time, the eNB transmits the information on the time when the terminal is triggered by the local ID and local counter allocated to the terminal along with the paging response message. In this case, the paging interval with the local ID may become longer than a predetermined paging interval. Accordingly, in order to prevent unnecessary step-wise paging of the MME, the eNB notifies the MME of the delayed paging interval. The eNB processes the paging at step 1350. That is, the eNB sends the UE a trigger message for paging in a frame. The terminal wakes up in the PO duration of the corresponding frame to check the trigger message and process the paging.

Although the description has been made with reference to particular embodiments, the present invention can be implemented with various modifications without departing from the scope of the present invention. Thus, the present invention is not limited to the particular embodiments disclosed but will include the following claims and their equivalents.

The invention claimed is:

1. A method for paging by a terminal in a mobile communication system, the method comprising:
receiving, by a terminal, a local counter value for synchronization with a base station and a local identifier (ID) allocated to the terminal from the base station;
synchronizing, by the terminal, with the base station using the local counter value;
entering an idle state; and
receiving, by the terminal, a paging request message in a subframe corresponding to the local counter value and the local ID.

2. The method of claim 1, further comprising:
receiving, after entering the idle state, a second local counter value and a second local ID from a second base station; and
deleting, when a predetermined period elapses, the local counter value and local ID received from the base station.

3. The method of claim 1, wherein the local ID is a group local ID allocated to at least one terminal among the terminals synchronized with the base station.

4. The method of claim 3, wherein the group local ID is generated by selecting a common part of a plurality of the local IDs.

5. The method of claim 4, wherein the receiving the paging request message comprises identifying the paging request message in a paging occasion (PO) duration determined based on the local ID and the local counter value.

6. The method of claim 5, wherein the receiving the local counter value and the local ID comprises receiving a Radio Resource Control (RRC) Connection Release message including the local counter value and the local ID.

7. A method for paging by a base station in a mobile communication system, the method comprising:
transmitting, by the base station, a local counter value for synchronization with a terminal and a local identifier (ID) to the terminal;
receiving, by the base station, a first paging request message from a mobility management entity (MME); and
transmitting, by the base station, to the terminal a second paging request message in a subframe corresponding to the local counter value and the local ID.

8. The method of claim 7, wherein the local ID is a group local ID allocated to at least one terminal among the terminals synchronized with the base station.

9. The method of claim 8, wherein the group local ID is generated by selecting a common part of a plurality of the local IDs.

10. The method of claim 9, wherein the transmitting of the second paging request message comprises transmitting the paging request message in a paging occasion (PO) duration determined based on the local ID and the local counter value.

11. The method of claim 10, wherein the transmitting the local counter value and the local ID comprises transmitting a Radio Resource Control (RRC) Connection Release message including the local counter value and the local ID to the terminal.

12. A terminal for processing a paging in a mobile communication system, the terminal comprising:
   a communication unit for transmitting and receiving signals to and from a base station; and
   a control unit for controlling to receive, by the terminal, a local counter value for synchronization with the base station and a local identifier (ID) allocated to the terminal from the base station, synchronize, by the terminal with the base station using the local counter value, enter an idle state, and receive, by the terminal, a paging request message in a subframe corresponding to the local counter value and the local ID.

13. The terminal of claim 12, wherein the control unit controls to receive, after entering the idle state, a second local counter value and a second local ID from a second base station and delete, when a predetermined period elapses, the local counter value and the local ID received from the base station.

14. The terminal of claim 12, wherein the local ID is a group local ID allocated to at least one terminal among the terminals synchronized with the base station.

15. The terminal of claim 14, wherein the group local ID is generated by selecting a common part of a plurality of the local IDs.

16. The terminal of claim 15, wherein the control unit controls to identify the paging request message in a paging occasion (PO) duration determined based on the local ID and the local counter value.

17. The terminal of claim 16, wherein the control unit controls to receive a Radio Resource Control (RRC) Connection Release message including the local counter value and the local ID.

18. A base station for paging a terminal in a mobile communication system, the base station comprises:
   a communication unit for transmitting and receiving signal to and from a terminal or a mobility management entity (MME); and
   a control unit for controlling to transmit, by the base station, a local counter value for synchronization with a terminal and a local identifier (ID) to the terminal, receive, by the base station, a first paging request message from a mobility management entity (MME), and transmit, by the base station, to the terminal a second paging request message in a subframe corresponding to the local counter value and the local ID.

19. The base station of claim 18, wherein the local ID is a group local ID allocated to at least one terminal among the terminals synchronized with the base station.

20. The base station of claim 19, wherein the group local ID is generated by selecting a common part of a plurality of the local IDs.

21. The base station of claim 20, wherein the control unit controls to transmit the second paging request message in a paging occasion (PO) duration corresponding to the local ID and the local counter value.

22. The base station of claim 21, wherein the control unit controls to transmit a Radio Resource Control (RRC) Connection Release message including the local counter value and the local ID to the terminal.

* * * * *